No. 834,375. PATENTED OCT. 30, 1906.
J. H. FARMAN.
VEHICLE BRAKE.
APPLICATION FILED MAR. 8, 1906.
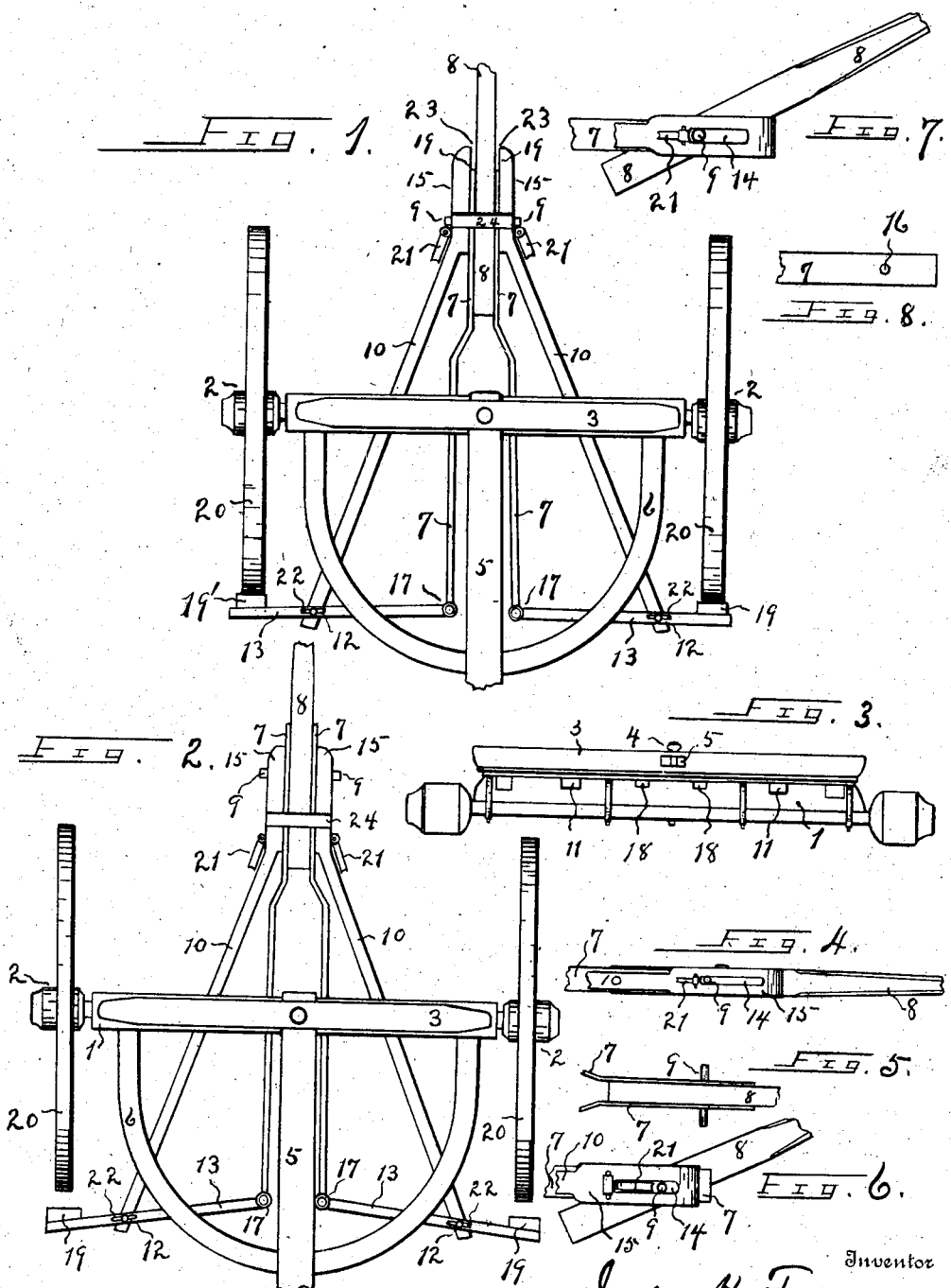

UNITED STATES PATENT OFFICE.

JESSE H. FARMAN, OF OMAHA, NEBRASKA.

VEHICLE-BRAKE.

No. 834,375.  Specification of Letters Patent.  Patented Oct. 30, 1906.

Application filed March 8, 1906. Serial No. 304,972.

*To all whom it may concern:*

Be it known that I, JESSE H. FARMAN, a citizen of the United States, residing at 3016 North Twentieth street, Omaha, in the county of Douglas and State of Nebraska, have invented certain new and useful Improvements in Vehicle-Brakes, of which the following is a specification.

My invention relates to improvement in vehicle-brakes, and more particularly brakes for draft-wagons.

The object of the invention is to provide a brake which for its operation requires no attention on the part of the driver, but which is under control of the vehicle-tongue and neck-yoke of the team.

Another object of the invention is to provide an improvement in the construction of other parts of the vehicle, particularly the wagon-hounds, convenient for use in connection with the invention. The driver must remain upon the loaded vehicle when going down an incline in order to operate the wagon-brake now in general use, as is well known, and where the load is bulky—as, for instance, when the vehicle is loaded with hay—the brake is practically inoperative. The operation of the present brake is certain and effective to answer all the requirements of a vehicle-brake and is comparatively inexpensive, since the parts are few.

The novel construction and arrangement of the parts of the invention are fully described herein and pointed out in the claims and illustrated by the drawings, wherein—

Figure 1 represents a plan view of the front part of a vehicle, disclosing the invention, the the brake-shoes being in contact with the wheels. Fig. 2 is a somewhat similar view to Fig. 1, showing position of the parts when the brake-shoes are out of contact with the wheels. Fig. 3 represents a vertical horizontal elevation of a wagon-axle and rocker or bolster mounted thereon, being a rear view to more clearly show the mounting of certain parts of the invention. Fig. 4 represents a vertical side view of a portion of front hounds to exhibit a slot to be described herein. Fig. 5 represents a plan view of a portion of the tongue to clearly show formation of trunnion and other parts. Figs. 6 and 7 represent side views of a part of the invention to show inclination of tongue and positions of trunnion within slot, also different positions of the cam; and Fig. 8 is intended to more clearly show location of aperture 16 within the walls of arms 7.

In the drawings the numeral 1 represents a wagon-axle, and mounted thereon are the front wheels 2 of a wagon. The rocker or bolster 3 is mounted upon the axle 1 and held in position by the coupling-pin 4, the latter passing through the reach 5. The rear hounds to the front gear are shown by the numeral 6. The parts thus mentioned are common to all wagons, and for the purposes of my invention I construct a pair of slidable arms or links 7 and mount them one upon either side of the tongue 8 in a manner presently described.

I construct front hounds 10, which pass rearwardly through apertures 11 of the axle 1, the ends being extended to a point between and somewhat to the rear of wheels 2 to furnish the pivotal mounting 12 of the brake-levers 13. The tongue 8 is provided with the trunnion 9, seated in slot 14 of the heads 15 of hounds 10. The arms 7 are provided with suitable apertures 16, Fig. 8, to furnish a mounting upon trunnion 9 and pass rearwardly substantially parallel with the tongue through apertures 18 of axle 1 to points between the rear parts of wheels 2, where they are pivotally mounted at 17 upon the inner ends of brake-levers 13, and upon brake-levers 13 I rigidly mount brake-shoes 19'.

The backing movement of a vehicle is performed by the team, the neck-yoke forcing the tongue backward, as is well known, and from the description given it will be readily understood that the tongue 8 is slidable lengthwise between heads 15 of the hounds a limited distance, this distance being the extent of slot 14, and when slot 14 is open or unobstructed a backing movement of the team will cause trunnion 9 to travel backward the length of slot 14, as is evident, carrying with it the arms 7 mounted thereon, at which time the parts will be in the position shown by Fig. 1. At the time of this movement the inner faces 19 of heads 15 furnish a bearing-surface for the sliding thereon of arms 7, and the tongue being positioned between these arms the heads 15 operate in a manner to cause the parts to remain in alinement during the movement, and the parts will travel backward, arms 7 pressing backward upon the pivotal mounting 17 of levers 13, which cause a compression of shoes 19' against the tire 20 of wheels 2, and when driving down a hill the brakes operate in a very effective manner, since the greater incline causes a correspondingly-greater impact of the brakes upon the tires and requires no attention of the driver whatever. The employment of the invention is of great utility when driving a restless or fractious team, as the ordinary hand-lever brake is an incumbrance, and for use of farmers when moving bulky loads the invention is very useful.

When "backing" the vehicle on level ground, in order to prevent a contact of the brake with the tire a backward movement of the tongue is prevented by any convenient means, as by obstructing the slot 14 by means of the cam 21, adapted to swing within and occupy a rear portion of slot 14 when desired.

The parts are few and not expensive in construction. The pivotal mounting at 12 of levers 13 may be varied in the distance between the brake-shoes and the mounting at 17 by constructing the hounds 10 at a different angle, and the slots 22 may be used to permit a true lengthwise movement of the arms 7 while causing a partial rotation of the brake-levers. The parallel heads 15 of the hounds 10 are maintained in a fixed relative position in any convenient manner, as by the cross-piece 24, the arms 7 being housed within slots 23.

What I claim as my invention is—

1. In combination with a wagon-axle, wagon-hounds, and the front wheels of a wagon; a vehicle-brake comprising a trunnion formed upon said wagon-tongue; arms mounted upon said trunnion and extending rearwardly through said wagon-axle to adjacent points between said wagon-wheels; said wagon-hounds formed with parallel portions, and angularly-extending portions; a slot formed within said parallel portions of said wagon-hounds; said wagon-tongue and said arms mounted between said parallel portions of said wagon-hounds; said trunnion of said wagon-tongue seated in said lengthwise slot of said parallel portions of said wagon-hounds; each angularly-extending portion of said wagon-hounds passing rearwardly through said wagon-axle and positioned between one of said wagon-wheels and one of said arms; a brake-lever pivotally mounted upon each of said arms and each of said angularly-extending portion of said wagon-hounds; and means to cause a partial closure of said lengthwise-extending slot formed within the parallel portions of said wagon-hounds.

2. A vehicle-brake of the class described in combination with a wagon-axle, a wagon-tongue, the front hounds and front wheels of a wagon; the trunnion 9 formed upon the tongue; the arms 7; the apertures 18 formed within said wagon-axle; the wagon-brake 13 pivotally mounted at 12 and at 17; the slot 14 adapted to receive the trunnion 9; the slots 23 formed between said tongue and said hounds; and a means to cause a partial closure of said slot 14, substantially as set forth and described.

In testimony whereof I have affixed my signature in presence of two witnesses.

JESSE H. FARMAN.

Witnesses:
FREDERIC BAEM,
H. A. STURGES.